Figure 1:
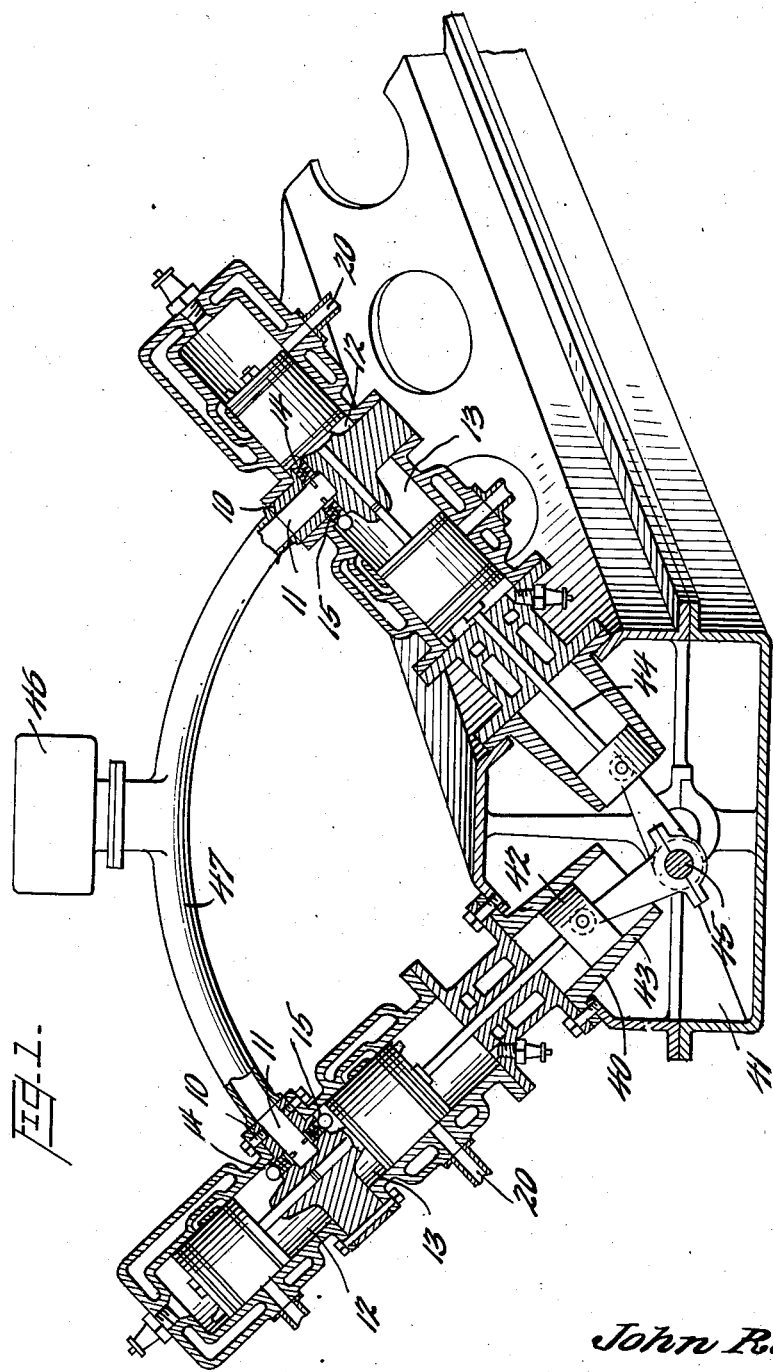

Sept. 19, 1944.　　　　　J. RUPERT　　　　　2,358,660
TANDEM TWO CYCLE INTERNAL-COMBUSTION ENGINE
Filed Dec. 9, 1942　　　　2 Sheets-Sheet 1

Inventor
John Rupert,
By Parry & Miller
Attorney

Sept. 19, 1944. J. RUPERT 2,358,660
TANDEM TWO CYCLE INTERNAL-COMBUSTION ENGINE
Filed Dec. 9, 1942 2 Sheets-Sheet 2
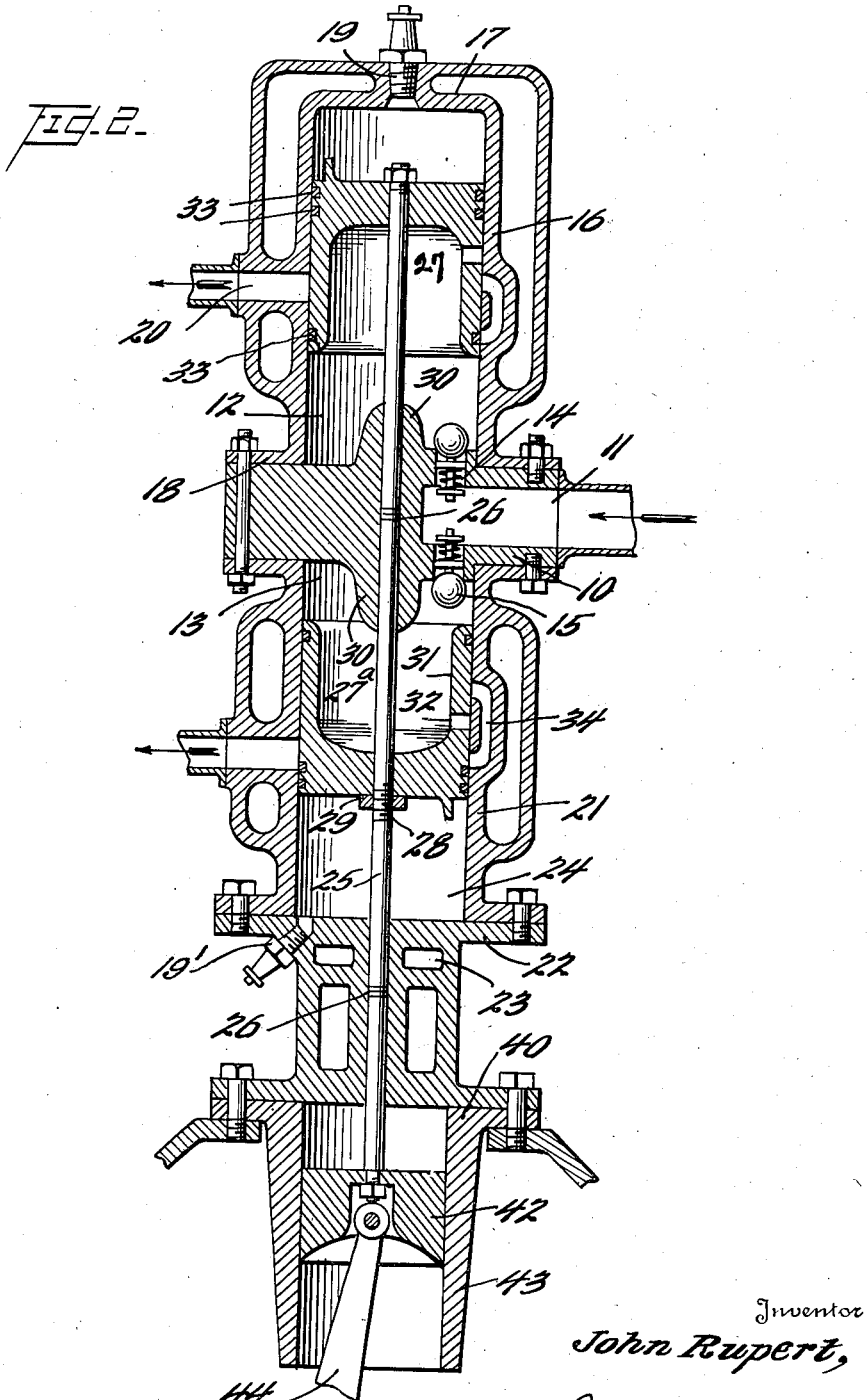

Patented Sept. 19, 1944

2,358,660

UNITED STATES PATENT OFFICE 2,358,660

TANDEM TWO-CYCLE INTERNAL-
COMBUSTION ENGINE

John Rupert, Coos County, Oreg.

Application December 9, 1942, Serial No. 468,394

6 Claims. (Cl. 123—57)

The present invention relates to improvements in two-cycle tandem internal combustion engines and aims generally to improve existing engines of this type.

One of the objects of the invention is the provision of an internal combustion engine composed of two units each of which comprises a tandem two-cycle engine so that the motor has four power impacts for each revolution of the crankshaft as in the case of an eight cylinder four-cycle engine.

A further object of the invention is the provision of a two-cycle engine so constructed that the crankshaft and connecting rods operate in a bath of oil permitting splash lubrication of the crossheads.

A further object of the invention is the provision of a novel construction of piston and piston rods, to maintain operation of the piston in a straight line eliminating piston torque and excessive wear of the piston rings and cylinders.

Furthermore, an object of the invention is the provision of an engine of novel construction as to its arrangement and details to increase the efficiency of engines of the two-cycle type.

In order to illustrate the invention, reference is had to the accompanying drawings illustrating a preferred construction, and wherein Fig. 1 is a sectional perspective view of my improved V-motor tandem engine; and Fig. 2 is an enlarged sectional view of a tandem unit.

According to the invention, my improved engine may be composed of two units, mounted in V-formation, and each disposed at a proper inclination to a vertical plane between them, as for example at a 45-degree inclination.

Each of the units comprises intake heads 10 formed with central intake ports 11 leading to upper and lower intake chambers 12 and 13 respectively. Suitable valves 14 normally close the passage between the intake ports 11 and the intake chambers 12, while similar valves 15 normally close the passages between the ports 11 and lower intake chambers 13. The valves are preferably operable automatically with the intake stroke of the piston but if desired, suitable valve operating mechanism (not shown) may be provided for opening and closing the valves at proper times as is well understood in the art.

The upper intake chambers 12 are formed as portions of elongated upper cylinders 16, preferably of the liquid cooled type, having a closed head 17 and a flanged base 18 for attachment to the upper face of the intake heads 10. The head 17 may be provided with a suitable opening for ignition means, as for example, spark plugs 19, and a lateral exhaust port 20 is provided substantially midway the length of the cylinder.

A lower cylinder 21 is provided below the intake head 10 and is of the same construction as the upper cylinders 16 except that it is open ended, and flanged at both ends for attachment to the crankcase head 22 and intake head 10.

The crankcase head 22 provides a support for the cylinders of each unit, and preferably has formed in its upper end a water cooling jacket 23 adjacent to the lower combustion chamber 24 of the lower cylinder. Also the head 22 may be provided with ignition means, as for example spark plugs 19a opening into the chamber 24.

The intake head 10 and crankcase head 22 of each unit provide spaced supports which may be bored to provide spaced elongated bearings for a piston rod 25 of a length substantially equal to the combined length of the two cylinders and two heads of each unit. The piston rod thus extends from below the crankcase head to a point near the upper end of upper cylinder 16 and is packed in the bores of the intake head and crankcase head by suitable packing rings on the rod, for example a plurality of expansible piston rings 26. The rings on the piston rod and the intake head seal the upper and lower intake chambers, and the rings on the piston rod and crankcase head seal the lower combustion chamber from the crankcase.

A pair of pistons 27—27a are mounted on each piston rod, one piston for each cylinder. The pistons are fixedly mounted on the rod and may be adjusted lengthwise thereof by means of threaded sections 28 on the rod so that the pistons may be secured in proper position by clamp nuts 29.

It will be noted that the intake heads 10 are formed with central extensions 30 extending into the adjacent intake chambers 12 and 13, so as to provide an elongated bearing for the piston rod 25. The pistons are hollowed out interiorly, as at 31 and are open at their inner ends so as to be moved to the plane faces of the intake head where they cover the extensions. The pistons are further formed with a port 32 communicating between the cored interior 30 and the outer face of the piston. The pistons may be provided with suitable rings on the rod, for example, piston rings 33, two rings being shown at the head end and one ring at the skirt end.

As the piston is moved in its respective cylinder in a direction away from the intake head, the action is to draw an explosive charge into the intake chambers behind the piston, and the charge outwardly beyond the piston is being compressed. This latter charge is then ignited, the piston is moved on its power stroke, the charge on the opposite side being partially compressed until the piston reaches its inner position, at which time port 32 is aligned with a bypass 34 in the cylinder, permitting the partially compressed charge to flow to the outer end of the piston.

The tandem units are preferably mounted on bases 40 bolted to an oil filled crankcase 41, and advantageously the units are disposed in acute angular relation so as to form a V. As will be noted in Fig. 1, the lower ends of the piston rods extend through the bases 40, having rings on the piston rod therein to seal the lower combustion chamber from the crankcase 41, and are connected at their extremities to a crosshead 42 working between guides 43 extending into the crankcase. The crossheads 42 are connected to connecting rods 44 which in turn are suitably connected to a crankshaft 45 in a conventional manner.

The offset portions of the crankshaft are disposed at inclinations less than 90° so that the pistons of one tandem unit are intermediate the ends of their strokes when the pistons of the other unit are at the ends of their strokes.

The engine may be supplied with fuel from a carburetor 46, of suitable design, delivering gaseous fuel to a manifold 47 leading to each of the intake heads. The exhaust ports 20 obviously may be joined to an exhaust manifold (not shown).

Among the principal advantages of the invention is the provision of an improved multiple tandem unit motor which has at least four power strokes per revolution of the crankshaft. The arrangement of the tandem units in V-formation crossheads, guides and connecting rods within the crankcase, provides for proper lubrication of these parts, as the crankshaft and connecting rods may run in oil and the guides and crossheads may be lubricated by splash. By mounting and installing the pistons on the piston rod in the manner disclosed, the pistons run in a straight line, minimizing piston torque and eliminating excessive piston ring and cylinder wear.

I claim:

1. A tandem cylinder two-cycle internal combustion engine unit comprising a base, a pair of spaced cylinders carried by said base, an intake head disposed between said cylinders, means for delivering fuel to said head, an elongated piston rod slidably fitted through said base and intake head, said intake head formed with axial extensions extending into said cylinders and forming an elongated bearing for said piston rod, a pair of oppositely disposed pistons of cup-shaped cross section mounted on said piston rod, there being one piston in each cylinder, and ignition means at the ends of said cylinders opposite the central intake head.

2. A tandem cylinder two-cycle internal combustion engine unit comprising a base, a pair of spaced liquid cooled cylinders carried by said base, an intake head disposed between said cylinders and formed with opposed integral axial extensions extending into opposite cylinders and formed with an elongated axial bearing, means for delivering fuel to said head, an elongated piston rod slidably fitted through said base and bearing, a pair of oppositely disposed pistons of cup-shaped cross section mounted on said piston rod, there being one piston for each cylinder, and ignition means at the ends of the cylinder opposite the central intake head.

3. A tandem cylinder two-cycle internal combustion engine unit comprising a base, a pair of spaced liquid cooled cylinders carried by said base, an intake head disposed between said cylinders and formed with opposed integral axial extensions extending into opposite cylinders and formed with an elongated axial bearing, means for delivering fuel to said head, an elongated piston rod slidably fitted through said base and bearing, a pair of oppositely disposed pistons of cup-shaped cross section mounted on said piston rod and adapted in one position to embrace said extensions, there being one piston for each cylinder, and ignition means at the ends of the cylinder opposite the central intake head.

4. A tandem cylinder two cycle internal combustion engine as defined in claim 1 further characterized in that the intake head is provided with oppositely arranged spring tensioned valves adjacent the axial extension of the head and in communication with the fuel delivery means.

5. A tandem cylinder two cycle internal combustion engine as defined in claim 1 further characterized in that the intake head is provided with a lateral passage opening on the periphery thereof and terminating short of the bearing for the piston rod, said head being formed with oppositely disposed spring tensioned valves between said passage and said pair of spaced cylinders.

6. A tandem cylinder two cycle internal combustion engine as defined in claim 1 further characterized in that the piston rod is provided with a split ring packing in sealing engagement with the walls of said bearing.

JOHN RUPERT.